United States Patent
Loehr et al.

(10) Patent No.: US 12,438,642 B2
(45) Date of Patent: Oct. 7, 2025

(54) DETERMINING DATA TRANSMISSION PREEMPTION

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Prateek Basu Mallick, Oberursel (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 689 days.

(21) Appl. No.: 17/763,139

(22) PCT Filed: Sep. 17, 2020

(86) PCT No.: PCT/IB2020/058647
§ 371 (c)(1),
(2) Date: Mar. 23, 2022

(87) PCT Pub. No.: WO2021/059089
PCT Pub. Date: Apr. 1, 2021

(65) Prior Publication Data
US 2022/0345252 A1  Oct. 27, 2022

Related U.S. Application Data

(60) Provisional application No. 62/904,633, filed on Sep. 23, 2019.

(51) Int. Cl.
*H04L 1/1812* (2023.01)
*H04L 1/08* (2006.01)

(52) U.S. Cl.
CPC .............. *H04L 1/1812* (2013.01); *H04L 1/08* (2013.01)

(58) Field of Classification Search
None
See application file for complete search history.

(56) References Cited

U.S. PATENT DOCUMENTS

2020/0146045 A1* 5/2020 Loehr .................... H04L 5/0048
2020/0351030 A1* 11/2020 Deogun ............ H04W 74/0808

OTHER PUBLICATIONS

"Invitation to Pay Additional Fees and, Where Applicable, Protest Fee", PCT, Nov. 19, 2020, pp. 1-9.
(Continued)

*Primary Examiner* — Minh Trang T Nguyen
(74) *Attorney, Agent, or Firm* — Kunzler Bean & Adamson

(57) ABSTRACT

Apparatuses, methods, and systems are disclosed for determining data transmission preemption. One method (400) includes receiving (402) a first uplink grant for a first hybrid automatic repeat request process. The method (400) includes determining (404) that a first data transmission corresponding to the first uplink grant is preempted by a second data transmission corresponding to a second uplink grant for a second hybrid automatic repeat request process. The method (400) includes, in response to determining that the first data transmission is preempted by the second data transmission: not generating (406) a transport block for the first uplink grant; and flushing a hybrid automatic repeat request buffer corresponding to the first hybrid automatic repeat request process.

15 Claims, 5 Drawing Sheets

(56) References Cited

OTHER PUBLICATIONS

"International Search Report", PCT, Jan. 26, 2021, pp. 1-5.
"Written Opinion of the International Searching Authority", PCT, Jan. 26, 2021, pp. 1-9.
3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.
LG Electronics, "Summary#4 of 7.2.6.7 Others", 3GPP TSG RAN WG1 #98 R1-1909851, Aug. 26-30, 2019, pp. 1-17.
LG Electronics Inc., "Assistant information for grant prioritization in PHY", 3GPP TSG-RAN WG2 Meeting #106 R2-1907879, May 13-May 17, 2019, pp. 1-2.

\* cited by examiner

DETERMINING DATA TRANSMISSION PREEMPTION

CROSS-REFERENCE TO RELATED APPLICATIONS

This application claims priority to U.S. Patent Application Ser. No. 62/904,633 entitled "APPARATUSES, METHODS, AND SYSTEMS FOR DETAILED UE BEHAVIOR FOR INTRA-UE PRIORITIZATION" and filed on Sep. 23, 2019 for Joachim Loehr, which is incorporated herein by reference in its entirety.

FIELD

The subject matter disclosed herein relates generally to wireless communications and more particularly relates to determining data transmission preemption.

BACKGROUND

The following abbreviations are herewith defined, at least some of which are referred to within the following description: Third Generation Partnership Project ("3GPP"), 5th Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Acknowledged Mode ("AM"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Configured Scheduling ("CS"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Dynamic Grant ("DG"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, data transmission preemption may occur.

BRIEF SUMMARY

Methods for determining data transmission preemption are disclosed. Apparatuses and systems also perform the functions of the methods. One embodiment of a method includes receiving a first uplink grant for a first hybrid automatic repeat request process. In some embodiments, the method includes determining that a first data transmission corresponding to the first uplink grant is preempted by a second data transmission corresponding to a second uplink grant for a second hybrid automatic repeat request process. In certain embodiments, the method includes, in response to determining that the first data transmission is preempted by the second data transmission: not generating a transport block for the first uplink grant; and flushing a hybrid automatic repeat request buffer corresponding to the first hybrid automatic repeat request process.

One apparatus for determining data transmission preemption includes a receiver that receives a first uplink grant for a first hybrid automatic repeat request process. In various embodiments, the apparatus includes a processor that: determines that a first data transmission corresponding to the first uplink grant is preempted by a second data transmission corresponding to a second uplink grant for a second hybrid automatic repeat request process; and, in response to determining that the first data transmission is preempted by the second data transmission: does not generate a transport block for the first uplink grant; and flushes a hybrid automatic repeat request buffer corresponding to the first hybrid automatic repeat request process.

One embodiment of a method for transmitting a transport block includes receiving an uplink grant for an initial transmission of data for a hybrid automatic repeat request process. In some embodiments, the method includes determining that a transport block for the hybrid automatic repeat request process is stored in a hybrid automatic repeat request buffer at a time the uplink grant is received. In certain embodiments, the method includes, in response to determining that a size of the transport block matches a grant size corresponding to the uplink grant, transmitting the transport block.

Another apparatus for transmitting a transport block includes a receiver that receives an uplink grant for an initial transmission of data for a hybrid automatic repeat request process. In various embodiments, the apparatus includes a processor that determines that a transport block for the hybrid automatic repeat request process is stored in a hybrid automatic repeat request buffer at a time the uplink grant is received. In some embodiments, the apparatus includes a transmitter that, in response to determining that a size of the transport block matches a grant size corresponding to the uplink grant, transmits the transport block.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
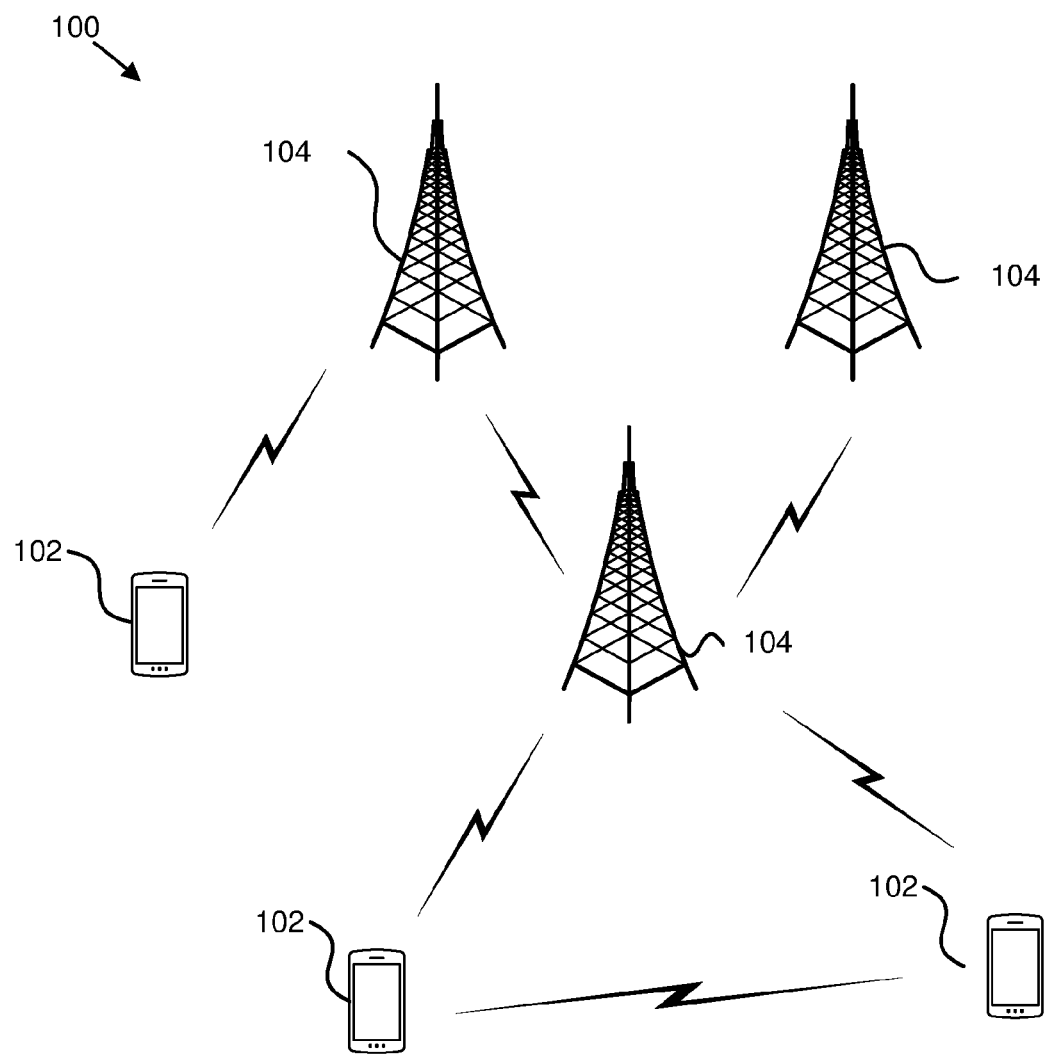
FIG. 1 is a schematic block diagram illustrating one embodiment of a wireless communication system for determining data transmission preemption.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining data transmission preemption. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a first uplink grant for a first hybrid automatic repeat request process. In some embodiments, the remote unit 102 may determine that a first data transmission corresponding to the first uplink grant is preempted by a second data transmission corresponding to a second uplink grant for a second hybrid automatic repeat request process. In some embodiments, the remote unit 102 may, in response to determining that the first data transmission is preempted by the second data transmission: not generate a transport block for the first uplink grant; and flush a hybrid automatic repeat request buffer corresponding to the first hybrid automatic repeat request process. Accordingly, the remote unit 102 may be used for determining data transmission preemption.

In certain embodiments, a remote unit 102 may receive an uplink grant for an initial transmission of data for a hybrid automatic repeat request process. In some embodiments, the remote unit 102 may determine that a transport block for the hybrid automatic repeat request process is stored in a hybrid automatic repeat request buffer at a time the uplink grant is received. In some embodiments, the remote unit 102 may, in response to determining that a size of the transport block matches a grant size corresponding to the uplink grant, transmit the transport block. Accordingly, the remote unit 102 may be used for determining data transmission preemption.

Figure 2:
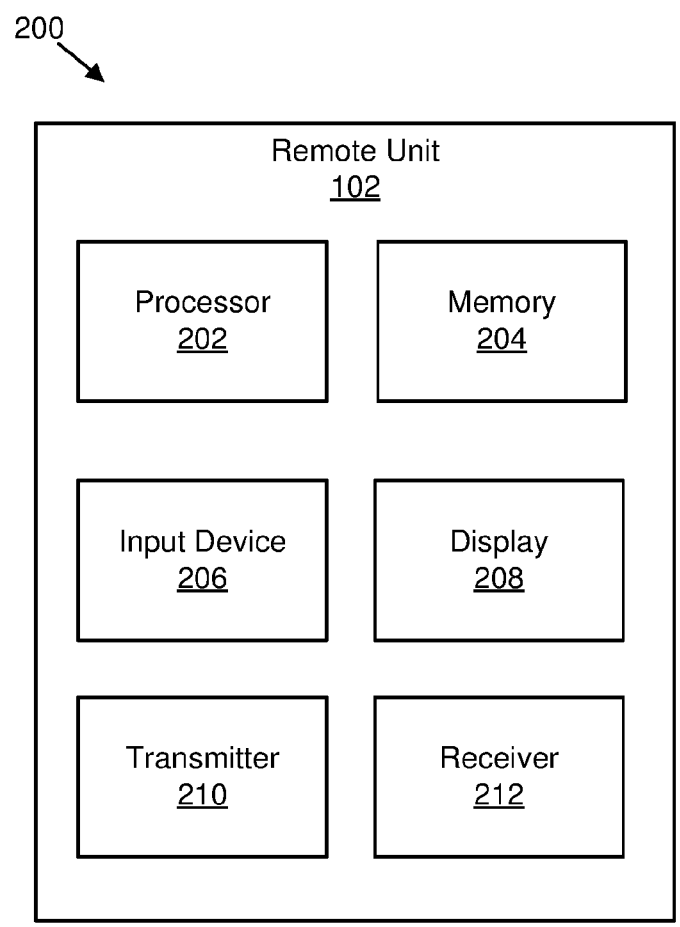
FIG. 2 is a schematic block diagram illustrating one embodiment of an apparatus that may be used for determining data transmission preemption.

FIG. 2 depicts one embodiment of an apparatus 200 that may be used for determining data transmission preemption. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The receiver 212 may receive a first uplink grant for a first hybrid automatic repeat request process. In various embodiments, the processor 202 may: determine that a first data transmission corresponding to the first uplink grant is preempted by a second data transmission corresponding to a second uplink grant for a second hybrid automatic repeat request process; and, in response to determining that the first data transmission is preempted by the second data transmission: does not generate a transport block for the first uplink grant; and flush a hybrid automatic repeat request buffer corresponding to the first hybrid automatic repeat request process.

The receiver 212 may receive an uplink grant for an initial transmission of data for a hybrid automatic repeat request process. In various embodiments, the processor 202 may determine that a transport block for the hybrid automatic repeat request process is stored in a hybrid automatic repeat request buffer at a time the uplink grant is received. In certain embodiments, the transmitter 210 may, in response to determining that a size of the transport block matches a grant size corresponding to the uplink grant, transmit the transport block.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
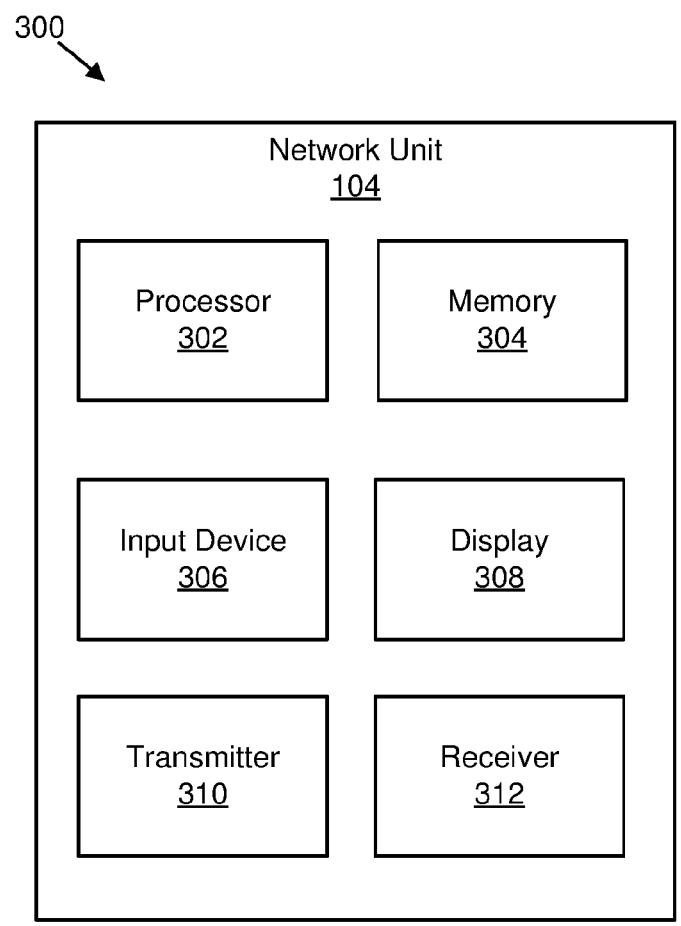
FIG. 3 is a schematic block diagram illustrating one embodiment of an apparatus that may be used for determining data transmission preemption.

FIG. 3 depicts one embodiment of an apparatus 300 that may be used for determining data transmission preemption. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may be used for receiving information described herein and/or the transmitter 310 may be used for transmitting information described herein and/or the processor 302 may be used for processing information described herein.

In certain embodiments, industrial IoT for URLLC may use both FR1 and FR2, and TDD and FDD. In various embodiments, L2 and/or L3 enhancements such as data duplication, multi-connectivity, and/or UL and/or DL intra-UE prioritization and/or multiplexing (e.g., prioritization, for example dropping, delaying, or puncturing a lower priority service) between different categories of traffic in a UE may be made, including both data and control channels.

In some embodiments, such as for uplink, a UE may be scheduled with two uplink grants allocating overlapping PUSCH resources for data of different priority levels. For example, a gNB may schedule an urgent and/or critical URLLC PUSCH transmission (e.g., using a high reliable MCS for the transmission) to pre-empt a previously scheduled PUSCH transmission intended for lower priority eMBB data. In certain embodiments, a gNB doesn't know whether a UE has generated a TB for a lower priority UL grant. In such embodiments, the gNB may not be aware of whether there are some TBs pending for transmission in a HARQ buffer of a HARQ process associated with the lower priority UL grant. In various embodiments, a UE may receive a dynamic UL grant either scheduling a retransmission or an initial transmission. In some embodiments, there may be different behaviors depending relating to whether a TB is pending. In certain embodiments, a UE may handle deprioritized (e.g., pre-empted) data and/or an UL grant aiming to avoid a loss of data.

In some embodiments, 3GPP may extend 5G NR to an unlicensed spectrum in 5 GHz and/or 6 GHz bands. In certain embodiments, 5G may be operated in an unlicensed spectrum alone without restrictions and without any anchor in a licensed spectrum. In various embodiments, AUL transmissions may have respectively configured grant transmissions. In some embodiments, AUL transmissions may be enabled through a combination of RRC signaling and an activation message conveyed by a DCI in a physical control channel. In certain embodiments, an RRC configuration may include slots in which a UE is enabled to transmit autonomously and/or the RRC configuration may include eligible HARQ process IDs. In various embodiments, an activation message may include an RBA and/or MCS from which a UE is able to determine a transport block size for any AUL transmission.

In some embodiments, if a TB has been generated for an AUL transmission on CG resources and LBT fails, a configuredGrantTimer may not be started. Such embodiments may lead to, at a next transmission opportunity for a same HARQ process, the configuredGrantTimer not running which in turn may trigger a UE to generate a new TB. Therefore, in such embodiments, a previous TB that couldn't be transmitted due to LBT failure may be lost. In certain embodiments, a gNB may not know whether a UE hasn't transmitted on a CG resource due to an occurrence of an LBT failure or due to the UE not having data for transmission (e.g., UL skipping). In such embodiments, the gNB may schedule an initial transmission for a corresponding HARQ process assuming that the UE has not generated a TB. To not lose data in a TB that is potentially pending in the HARQ buffer, the UE may transmit a pending TB even though a new transmission has been scheduled by the gNB (e.g., dynamic UL grant). In various embodiments, there may be recovery procedures for data pending for transmission in a HARQ buffer due to a failed LBT.

In some embodiments, such as for cases if a UE is configured with two UL carriers for a serving cell, a gNB may need to know when a PHR was generated to know what PHR type is reported in a PHR MAC CE (e.g., type 1 or type 3 PHR). In certain embodiments, a UE may report type-1 or type-3 PH depending on whether the UE determined a real or virtual PH for two carriers.

In various embodiments, if AUL for unlicensed access in NR (e.g., NR-U) is used, a gNB might not be able to determine when an UL transmission and/or TB has been initially generated due to potential LBT failures, even if the following transmission or retransmission of the same HARQ process is correctly decoded by the gNB. In such embodiments, uncertainty may have some negative impacts for PHR transmissions since a PHR content at a time of the transmission might not reflect a status corresponding to when it was generated. This may affect UL scheduling and/or link adaptation. In certain embodiments, two colliding UL grants may occur (e.g., one higher priority UL grant preempts a lower priority UL grant). In some embodiments, since a gNB may not be aware of whether a UE generated a TB for a lower priority grant, the gNB may not know upon reception of a TB, e.g. on a HARQ process associated with the lower priority grant, including a MAC CE, such as PHR MAC CE, when the MAC CE was generated by the UE.

As used herein an eNB and/or a gNB may be used to indicate a base station, but it may be replaced by any other suitable radio access node (e.g., BS, eNB, gNB, AP, NR etc.). Furthermore, various methods described herein may be described mainly in the context of 5G NR; however, the methods described herein may be equally applicable to other mobile communication systems supporting serving cells and/or carriers configured in an unlicensed spectrum LTE mobile wireless or cellular telecommunication system.

In a first embodiment, if a UE receives a retransmission grant (e.g., UL) for a HARQ process ID for which a HARQ buffer is empty, e.g. due to a higher priority UL grant having preempted a transmission of a TB for that HARQ process ID, the UE generates a new TB according to the retransmission grant and transmits the TB on the scheduled resources, e.g. UL resources. In one implementation of the first embodiment, the UL grant scheduling a retransmission is addressed to a CS-RNTI of the UE. In such an implementation, the UE may have a configured UL grant (e.g., and corresponding data for transmission) colliding with a higher priority grant (e.g. CG or DG), and the UE may have, due to the higher priority UL grant preempting the lower priority UL transmission on the CG resource, not generated a TB for the lower priority CG. In certain embodiments, if a deprioritized TB is to be transmitted on a configured grant resource, i.e., deprioritized UL grant is a configured grant, the gNB does not know whether the UE has skipped a configured grant occasion due to an empty buffer (e.g., no data available for transmission), or due to the higher priority UL grant preempting the CG transmission. In such embodiments, the gNB may not be aware of whether the UE has generated the TB for the lower priority grant which may depend on a UE implementation (e.g., a higher priority grant may be received when the UE has already started generation of the TB for the lower priority UL grant).

In certain embodiments, if DCI is addressed to CS-RNTI (e.g., scheduling a retransmission) received and an UL HARQ buffer is empty, then the DCI and/or a grant may be ignored by a UE (e.g., no new TB is generated) as shown in Table 1.

TABLE 1

2>else (i.e. retransmission):
   3>if the uplink grant received on PDCCH was addressed to CS-RNTI
     and if the HARQ buffer of the identified process is empty; or
   3>if the uplink grant is part of a bundle and if no MAC PDU has been
     obtained for this bundle; or
   3>if the uplink grant is part of a bundle of the configured uplink grant,
     and the PUSCH of the uplink grant overlaps with a PUSCH of
     another uplink grant received on the PDCCH or in a Random Access
     Response for this Serving Cell:
       4>ignore the uplink grant.

In certain implementations of the first embodiment, the UE, upon having received an uplink grant on PDCCH addressed to CS-RNTI and if a HARQ buffer of an identified process is empty due to some collision with a higher priority UL grant, may generate the MAC PDU according to the received UL grant (e.g., assumption is that the MAC PDU contains MAC SDUs—no empty MAC PDU).

In various embodiments, a UE flushes a HARQ buffer of a HARQ process for which no new TB has been generated due to some higher priority UL grant preempting a transmission for the HARQ process. In such embodiments, if an UL configured grant is preempted by some higher priority UL grant (e.g., dynamic grant or configured grant), and a UE doesn't generate a TB for the preempted CG, the UE may flush the HARQ buffer of the HARQ process associated with the preempted CG.

In a second embodiment, a UE may transmit a TB stored in a HARQ buffer of a HARQ process (e.g., HARQ process associated with a configured grant) upon having received an UL grant scheduling an initial transmission for the HARQ process if a grant size matches the size of a TB stored in the HARQ buffer. In one implementation of the second embodiment, the UE is only enabled to send a stored/pending TB on an UL-SCH scheduled for an initial transmission if the stored TB is generated for an UL grant (e.g., configured grant) that was deprioritized/preempted by some higher priority UL grant. In various embodiments of the second embodiment, a TB may have been generated for a lower priority grant that was preempted by some higher priority grant. In certain embodiments, to not lose data (e.g., deprioritized data) pending in the HARQ buffer, the UE may transmit the TB stored in the HARQ buffer even though a new transmission has been scheduled by the gNB. In such embodiments, the gNB doesn't know whether the UE has generated a TB for the lower priority (e.g., preempted) UL grant and, therefore, might schedule an initial transmission for the corresponding HARQ process assuming that the UE has not generated a TB for the lower priority UL grant.

In some embodiments, such as if a grant size (e.g., initial UL grant) does not match a size of a TB stored in a HARQ buffer of a HARQ process, a UE may generate a new TB according to the initial UL grant thereby taking MAC SDUs contained in the stored TB as an input to an LCP procedure. In certain implementations of the embodiment, the UE triggers an RLC retransmission for each of the RLC PDU and/or MAC SDU contained in the TB stored in the HARQ buffer and subsequently generates a new TB that may include RLC retransmissions (e.g., or part of an RCL retransmission). In such implementations, the UE may, according to a specified LCP procedure, consider triggered RLC retransmissions for generation of a new TB. Moreover, the UE, according to these implementations, may not wait for an RLC status report from a receiver triggering an RLC retransmission, but may autonomously internally trigger an RLC retransmission for RLC PDUs of logical channels that are configured with RLC AM mode (e.g., a MAC entity indicates to relevant RLC entities to trigger an RLC retransmission for RLC PDUs contained in a TB pending in a HARQ buffer). In various embodiments, a MAC and/or RLC protocol may facilitate retransmissions being prioritized over new RLC PDUs and multiplexed into a new TB scheduled by an initial UL grant.

In certain embodiments, if a TB size indicated by an initial UL grant is smaller than a TB size of a MAC PDU stored in a HARQ buffer (e.g., deprioritized data), a UE takes MAC subPDUs or MAC SDUs from a stored MAC PDU in descending priority order starting with a highest priority MAC SDU until an UL grant is exhausted. In such embodiments, the remaining space may be filled with MAC subPDUs (e.g., new MAC subPDUs) according to an LCP procedure and/or padding. In some embodiments, the priority of MAC subPDUs and/or MAC SDUs may be defined according a relative priority order and/or a logical channel priority configured by RRC signaling. In some embodiments, a UE may instruct a multiplexing and assembly procedure to newly generate MAC CEs contained in a TB stored in a HARQ buffer. For example, if a BSR MAC CE is contained within the MAC PDU in the HARQ buffer, then the UE may generate a new BSR MAC CE (e.g., reflecting the most recent buffer status) and may include it in the MAC PDU (e.g., if there is sufficient space according to an LCP procedure). In certain embodiments, a BSR MAC CE type may be different (e.g., truncated BSR MAC CE contained in a TB from a HARQ buffer), and a long BSR MAC CE may be included in a new MAC PDU according to an initial UL grant. In various embodiments, a UE may generate a new PHR MAC CE (e.g., according to the current power status) if a PHR MAC is included in a MAC PDU stored in a HARQ buffer. In some embodiments, regenerating MAC CEs may enable a gNB to assume that MAC CEs were generated at a time of a first HARQ transmission.

In certain embodiments, a UE may make an autonomous retransmission of a TB that was not transmitted due to a higher priority colliding UL grant. If a TB has been generated for a CG but could not be transmitted at the CG occasion due to a higher priority UL grant preempting the CG transmission, a UE may transmit the pending TB in a next transmission opportunity of the same HARQ process. The next transmission opportunity of the same HARQ process may be a configured grant resource or a scheduled grant resource. In various embodiments, a configuredGrantTimer may be started and/or restarted even if a TB was not transmitted on a configured grant resource due to a higher priority colliding UL grant (e.g., preemption).

In a third embodiment, a UE may be enabled to multiplex padding into a TB instead of multiplexing MAC CEs if the transmission of the TB is preempted by a higher priority UL transmission and/or UL grant and an LCP procedure has already been started and/or performed by the UE. According to one implementation of the third embodiment, the UE may be enabled to multiplex padding into a TB instead of multiplexing a PHR MAC CE in a TB if the transmission of the TB is preempted by a higher priority UL transmission and/or UL grant. In some embodiments, if UL MAC CEs are placed at the end of a TB after all MAC SDUs, even though the generation of the TB has been already started (e.g., if a higher priority UL grant is received), it may be possible to not multiplex a MAC CE in a TB and instead add padding without rerunning an LCP procedure. In certain embodiments, MAC CEs may be included in a higher priority UL transmission. Sending padding rather than MAC CEs in a deprioritized TB may be used for some MAC CEs to enable a gNB to know if the MAC CE was generated. In such embodiments, a gNB may need to know if a PHR has been generated to understand whether a PHR MAC CE contains a PHR type 1 or PHR type 3 report (e.g., for SUL). In some embodiments, a UE may be configured with two UL carriers for a serving cell and a gNB may need to know when (e.g., at what time) a PHR has been generated to know what PHR type is reported in a PHR MAC CE (e.g., type 1 or type 3 PHR). In various embodiments, because a gNB may not know whether a UE generated a TB for a lower priority UL grant (e.g., if two UL grants are colliding) being preempted by a higher priority grant, the gNB, upon receiving a TB on a HARQ process associated with a lower priority UL grant that was preempted, may not be aware of a time at which a MAC CE contained in the TB has been generated by the UE. For example, a UE may not generate a TB for a lower priority UL grant at a point of colliding with a higher priority UL grant, but may generate a TB upon receiving a retransmission grant. In this example, the gNB may not know if a received TB has been generated (e.g., at a time of an initial transmission attempt that has been preempted by a higher priority UL grant) or at the time when a retransmission grant has been scheduled. In various embodiments, because a PHR MAC CE may not be multiplexed in a TB, PHR related timers may not be affected (e.g., a UE may act as not having triggered and/or sent a PHR MAC CE).

In certain embodiments, a UE may multiplex MAC CEs (e.g., at least a PHR MAC CE) in a higher priority UL grant if a UE has two colliding UL grants. In various embodiments, UE implementation may choose an UL grant to multiplex MAC CEs if the UE and/or MAC is requested to simultaneously transmit multiple MAC PDUs, or if a MAC entity receives multiple UL grants within one or more coinciding PDCCH occasions. In some embodiments, a UE may multiplex a MAC CE (e.g., PHR MAC CE) on a higher priority UL grant if a lower priority UL grant is a configured grant.

In various embodiments, a UE may multiplex a MAC CE on a higher priority UL grant if the UE has mapped the MAC CE in a lower priority UL grant. In such an embodiment, the UE may multiplex a PHR MAC CE on the higher priority UL grant if a PHR MAC CE has already been mapped to the lower priority UL grant that is a configured grant (e.g., the UE has already generated or has started generating the TB according to the lower priority grant).

In a fourth embodiment, upon reception of an UL grant scheduling an initial transmission, a UE may transmit a TB pending for transmission due to an LBT failure in a HARQ buffer of a HARQ process associated with a configured grant if a grant size matches a size of a stored TB. In such an embodiment, an UL LBT may have failed for a PUSCH transmission (e.g., or PUSCH transmission attempt) on a configured grant or AUL resource associated with a HARQ process, and the UE may receive an initial UL grant (e.g., dynamic grant addressed to a C-RNTI of the UE). In the fourth embodiment, the UE may transmit the stored TB in the HARQ buffer of the corresponding HARQ process to avoid a loss of data. In some embodiments, if an UL grant size is larger than a size of a stored TB, a UE may append new data to data stored in a pending TB. In various embodiments, a UE may run an LCP procedure according to a received UL grant and may use MAC subPDUs (e.g., MAC SDUs) contained in the stored TB as input for the LCP procedure.

In certain embodiments, a UE generates and transmits a new TB and/or MAC PDU according to a received initial UL grant for a HARQ process for which a TB is pending in a HARQ buffer due to an LBT failure and moves the pending TB to another HARQ process available for transmission (e.g., configuredGrantTimer is not running for the HARQ process or empty HARQ buffer). In various embodiments, a UE may transmit a pending TB on a next transmit occasion for a HARQ process (e.g., configured grant occasion). As may be appreciated, by moving a pending TB (e.g., due to LBT failure) to another available and/or free HARQ process, a data loss may be avoided.

In a fifth embodiment, a priority of an UL grant and/or UL transmission may be determined based on data contained in a corresponding TB and/or MAC PDU against another colliding UL grant and/or transmission. In certain embodiments, for an UL grant scheduling a PUSCH transmission, a priority of the UL grant may be determined based on a logical channel priority of MAC SDUs contained in a TB (e.g., a highest priority among LCHs for which a MAC SDU is contained in a TB determines a priority of an UL grant and/or transmission). In various embodiments, not only MAC SDUs and/or LCHs are considered for determining a priority of an UL grant, but also MAC CEs (and their relative priority) contained in a TB. For example, if a TB corresponding to one UL grant contains a BSR MAC CE or PHR MAC CE, the corresponding UL grant has a higher priority than an UL grant for which the corresponding TB doesn't contain a MAC CE.

Figure 4:
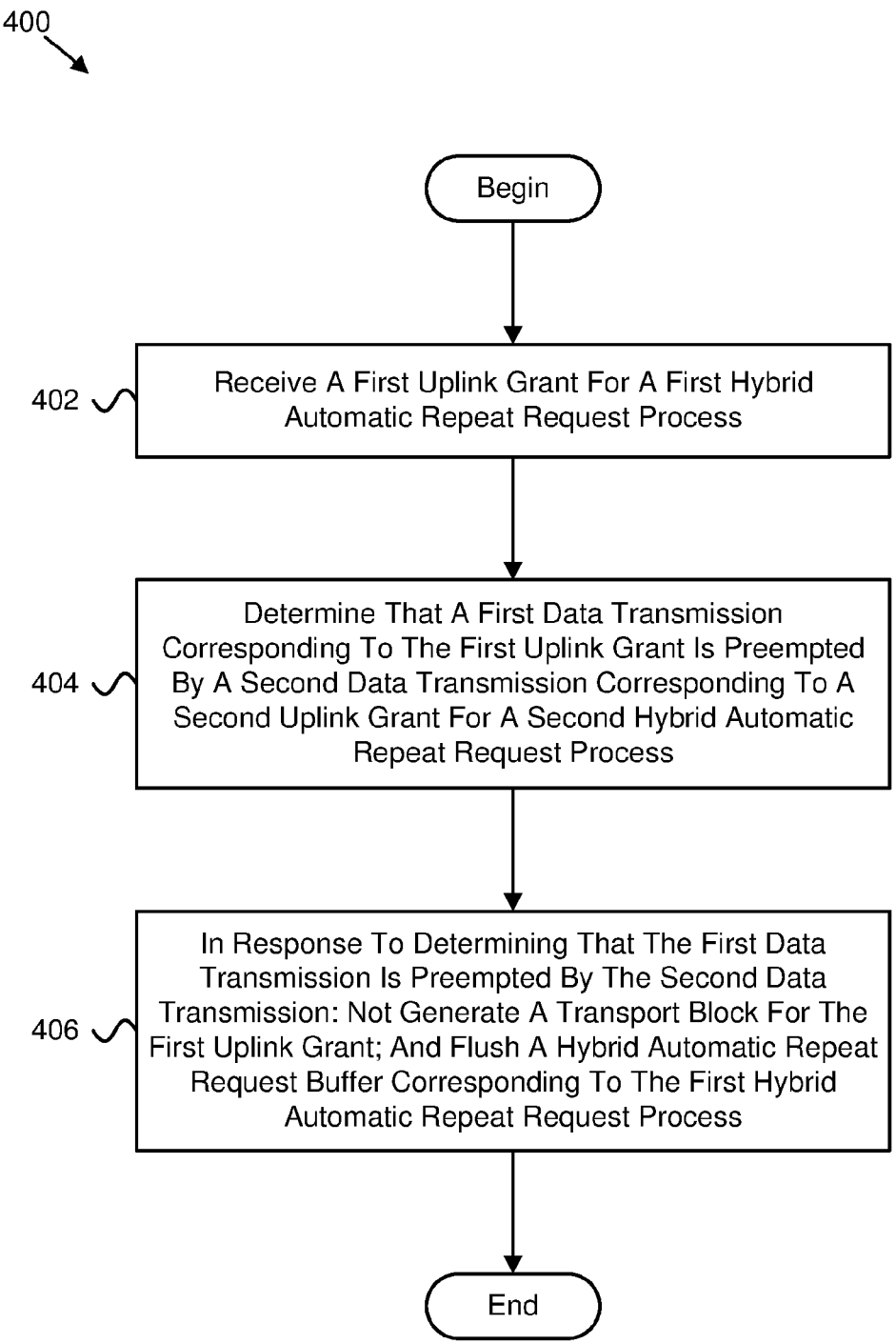
FIG. 4 is a flow chart diagram illustrating one embodiment of a method for determining data transmission preemption.

FIG. 4 is a flow chart diagram illustrating one embodiment of a method 400 for determining data transmission preemption. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes receiving 402 a first uplink grant for a first hybrid automatic repeat request process. In some embodiments, the method 400 includes determining 404 that a first data transmission corresponding to the first uplink grant is preempted by a second data transmission corresponding to a second uplink grant for a second hybrid automatic repeat request process. In some embodiments, the method 400 includes, in response to determining that the first data transmission is preempted by the second data transmission: not generating 406 a transport block for the first uplink grant; and flushing a hybrid automatic repeat request buffer corresponding to the first hybrid automatic repeat request process.

In certain embodiments, the second uplink grant has a higher priority than the first uplink grant. In some embodiments, the method 400 further comprises: receiving a retransmission grant for the first hybrid automatic repeat request process; determining that the hybrid automatic repeat request buffer is empty; and, in response to determining that the hybrid automatic repeat request buffer is empty, generating a new transport block based on the retransmission grant and transmitting the new transport block based on the retransmission grant. In various embodiments, the retransmission grant is addressed to a configured scheduling radio network temporary identifier.

In one embodiment, the method 400 further comprises: receiving a retransmission grant for the first hybrid automatic repeat request process; determining that the hybrid automatic repeat request buffer is empty; and, in response to determining that the hybrid automatic repeat request buffer is empty, generating a medium access control protocol data unit based on the retransmission grant. In certain embodiments, the retransmission grant is addressed to a configured scheduling radio network temporary identifier.

Figure 5:
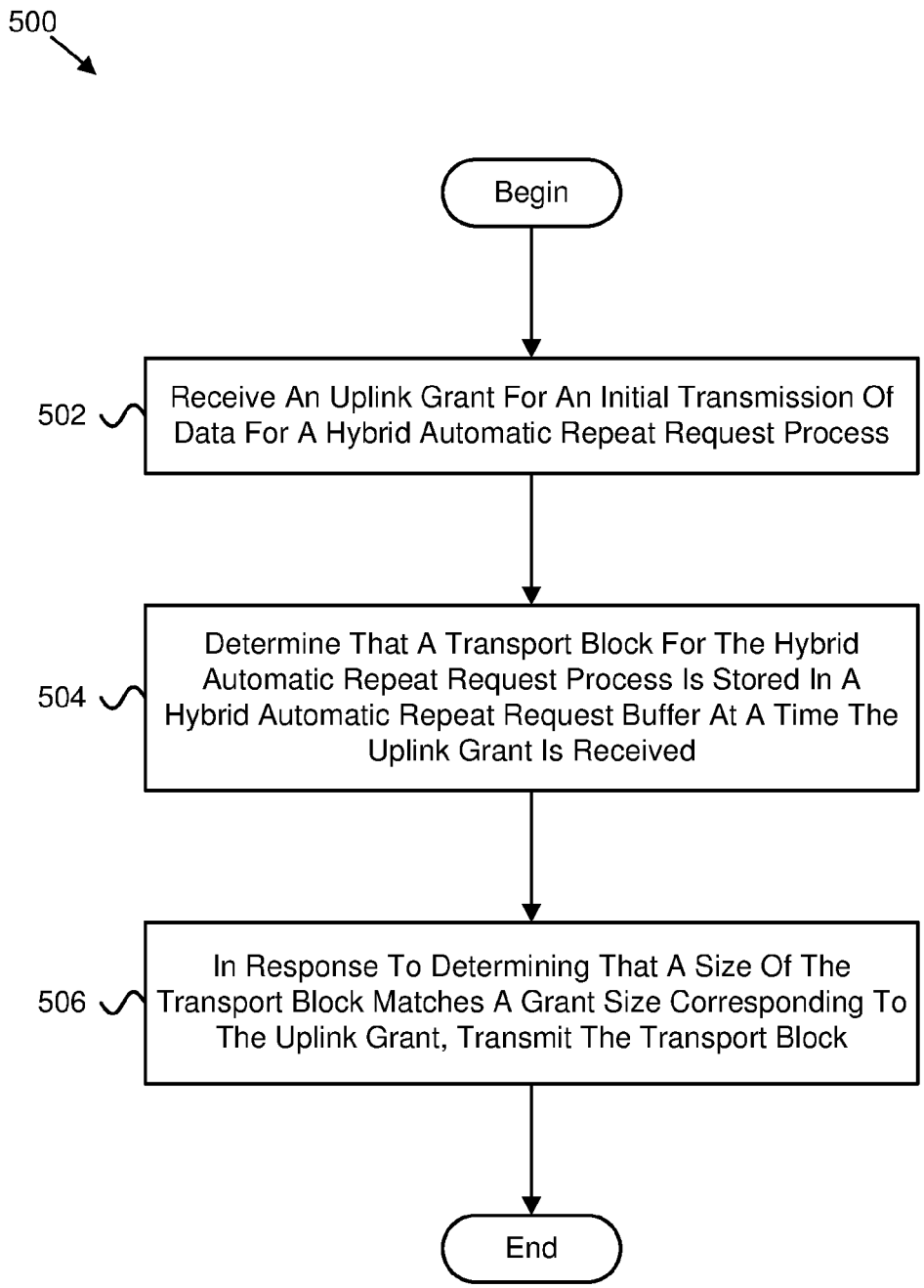
FIG. 5 is a flow chart diagram illustrating one embodiment of a method for transmitting a transport block.

FIG. 5 is a flow chart diagram illustrating one embodiment of a method 500 for transmitting a transport block. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes receiving 502 an uplink grant for an initial transmission of data for a hybrid automatic repeat request process. In some embodiments, the method 500 includes determining 504 that a transport block for the hybrid automatic repeat request process is stored in a hybrid automatic repeat request buffer at a time the uplink grant is received. In some embodiments, the method 500 includes, in response to determining that a size of the transport block matches a grant size corresponding to the uplink grant, transmitting 506 the transport block.

In certain embodiments, the method 500 further comprises preempting transmission of the transport block prior to receiving the uplink grant as a result of a higher priority uplink grant. In some embodiments, the method 500 further comprises, in response to determining that the size of the transport block does not match the grant size corresponding to the uplink grant, generating a new transport block based on the uplink grant. In various embodiments, generating the new transport block comprises taking at least one medium access control service data unit contained in the transport block as an input to a logical channel prioritization procedure.

In one embodiment, in response to determining that the size of the transport block does not match the grant size corresponding to the uplink grant, triggering a radio link control retransmission for each radio link control protocol data unit of a plurality of radio link control protocol data units that are contained in the transport block. In certain embodiments, generating the new transport block comprises generating the new transport block that includes at least a portion of radio link control retransmissions. In some embodiments, the radio link control retransmissions comprise at least one radio link control protocol data unit, at least one medium access control service data unit, or a combination thereof that are contained in the transport block.

In one embodiment, a method comprises: receiving a first uplink grant for a first hybrid automatic repeat request process; determining that a first data transmission corresponding to the first uplink grant is preempted by a second data transmission corresponding to a second uplink grant for a second hybrid automatic repeat request process; and, in response to determining that the first data transmission is preempted by the second data transmission: not generating a transport block for the first uplink grant; and flushing a hybrid automatic repeat request buffer corresponding to the first hybrid automatic repeat request process.

In certain embodiments, the second uplink grant has a higher priority than the first uplink grant.

In some embodiments, the method further comprises: receiving a retransmission grant for the first hybrid automatic repeat request process; determining that the hybrid automatic repeat request buffer is empty; and, in response to determining that the hybrid automatic repeat request buffer is empty, generating a new transport block based on the retransmission grant and transmitting the new transport block based on the retransmission grant.

In various embodiments, the retransmission grant is addressed to a configured scheduling radio network temporary identifier.

In one embodiment, the method further comprises: receiving a retransmission grant for the first hybrid automatic repeat request process; determining that the hybrid automatic repeat request buffer is empty; and, in response to determining that the hybrid automatic repeat request buffer is empty, generating a medium access control protocol data unit based on the retransmission grant.

In certain embodiments, the retransmission grant is addressed to a configured scheduling radio network temporary identifier.

In one embodiment, an apparatus comprises: a receiver that receives a first uplink grant for a first hybrid automatic repeat request process; and a processor that: determines that a first data transmission corresponding to the first uplink grant is preempted by a second data transmission corresponding to a second uplink grant for a second hybrid automatic repeat request process; and, in response to determining that the first data transmission is preempted by the second data transmission: does not generate a transport block for the first uplink grant; and flushes a hybrid automatic repeat request buffer corresponding to the first hybrid automatic repeat request process.

In certain embodiments, the second uplink grant has a higher priority than the first uplink grant.

In some embodiments: the receiver receives a retransmission grant for the first hybrid automatic repeat request process; the processor determines that the hybrid automatic repeat request buffer is empty; and the processor, in response to determining that the hybrid automatic repeat request buffer is empty, generates a new transport block based on the retransmission grant and transmitting the new transport block based on the retransmission grant.

In various embodiments, the retransmission grant is addressed to a configured scheduling radio network temporary identifier.

In one embodiment: the receiver receives a retransmission grant for the first hybrid automatic repeat request process; the processor determines that the hybrid automatic repeat request buffer is empty; and the processor, in response to determining that the hybrid automatic repeat request buffer is empty, generates a medium access control protocol data unit based on the retransmission grant.

In certain embodiments, the retransmission grant is addressed to a configured scheduling radio network temporary identifier.

In one embodiment, a method comprises: receiving an uplink grant for an initial transmission of data for a hybrid automatic repeat request process; determining that a transport block for the hybrid automatic repeat request process is stored in a hybrid automatic repeat request buffer at a time the uplink grant is received; and, in response to determining that a size of the transport block matches a grant size corresponding to the uplink grant, transmitting the transport block.

In certain embodiments, the method further comprises preempting transmission of the transport block prior to receiving the uplink grant as a result of a higher priority uplink grant.

In some embodiments, the method further comprises, in response to determining that the size of the transport block does not match the grant size corresponding to the uplink grant, generating a new transport block based on the uplink grant.

In various embodiments, generating the new transport block comprises taking at least one medium access control service data unit contained in the transport block as an input to a logical channel prioritization procedure.

In one embodiment, in response to determining that the size of the transport block does not match the grant size corresponding to the uplink grant, triggering a radio link control retransmission for each radio link control protocol data unit of a plurality of radio link control protocol data units that are contained in the transport block.

In certain embodiments, generating the new transport block comprises generating the new transport block that includes at least a portion of radio link control retransmissions.

In some embodiments, the radio link control retransmissions comprise at least one radio link control protocol data unit, at least one medium access control service data unit, or a combination thereof that are contained in the transport block.

In one embodiment, an apparatus comprises: a receiver that receives an uplink grant for an initial transmission of data for a hybrid automatic repeat request process; a processor that determines that a transport block for the hybrid automatic repeat request process is stored in a hybrid automatic repeat request buffer at a time the uplink grant is received; and a transmitter that, in response to determining that a size of the transport block matches a grant size corresponding to the uplink grant, transmits the transport block.

In certain embodiments, the processor preempts transmission of the transport block prior to receiving the uplink grant as a result of a higher priority uplink grant.

In some embodiments, the processor, in response to determining that the size of the transport block does not match the grant size corresponding to the uplink grant, generates a new transport block based on the uplink grant.

In various embodiments, the processor generating the new transport block comprises the processor taking at least one medium access control service data unit contained in the transport block as an input to a logical channel prioritization procedure.

In one embodiment, the processor, in response to determining that the size of the transport block does not match the grant size corresponding to the uplink grant, triggers a radio link control retransmission for each radio link control protocol data unit of a plurality of radio link control protocol data units that are contained in the transport block.

In certain embodiments, the processor generating the new transport block comprises the processor generating the new transport block that includes at least a portion of radio link control retransmissions.

In some embodiments, the radio link control retransmissions comprise at least one radio link control protocol data unit, at least one medium access control service data unit, or a combination thereof that are contained in the transport block.

Embodiments may be practiced in other specific forms. The described embodiments are to be considered in all respects only as illustrative and not restrictive. The scope of the invention is, therefore, indicated by the appended claims rather than by the foregoing to description. All changes which come within the meaning and range of equivalency of the claims are to be embraced within their scope.

The invention claimed is:

1. A method performed by a user equipment (UE), the method comprising:
receiving a first uplink grant associated with a first hybrid automatic repeat request (HARQ) process;
receiving a second uplink grant associated with a second HARQ process, wherein the second uplink grant has a higher priority than the first uplink grant;
determining that a first data transmission corresponding to the first uplink grant is preempted by a second data transmission corresponding to the second uplink grant; and
in response to determining that the first data transmission is preempted by the second data transmission:
not generating a transport block for the first uplink grant; and
flushing a HARQ buffer corresponding to the first HARQ process.

2. The method of claim 1, further comprising:
receiving a retransmission grant for the first HARQ process;
determining that the HARQ buffer is empty; and
in response to determining that the HARQ buffer is empty, generating a new transport block based on the retransmission grant and transmitting the new transport block based on the retransmission grant.

3. The method of claim 2, wherein the retransmission grant is addressed to a configured scheduling radio network temporary identifier (RNTI).

4. The method of claim 1, further comprising:
receiving a retransmission grant for the first HARQ process;
determining that the HARQ buffer is empty; and
in response to determining that the HARQ buffer is empty, generating a medium access control (MAC) protocol data unit (PDU) based on the retransmission grant.

5. The method of claim 4, wherein the retransmission grant is addressed to a configured scheduling radio network temporary identifier (RNTI).

6. A user equipment (UE), comprising:
at least one memory; and
at least one processor coupled with the at least one memory and configured to cause the UE to:
  receive a first uplink grant associated with a first hybrid automatic repeat request (HARQ) process;
  receive a second uplink grant associated with a second HARQ process, wherein the second uplink grant has a higher priority than the first uplink grant;
  determine that a first data transmission corresponding to the first uplink grant is preempted by a second data transmission corresponding to the second uplink grant; and
  in response to the determination that the first data transmission is preempted by the second data transmission:
    not generate a transport block for the first uplink grant; and
    flush a HARQ buffer corresponding to the first HARQ process.

7. The UE of claim 6, wherein the at least one processor is configured to cause the UE to:
  receive a retransmission grant for the first HARQ process;
  determine that the HARQ buffer is empty; and
  in response to determining that the HARQ buffer is empty, generate a new transport block based on the retransmission grant and transmit the new transport block based on the retransmission grant.

8. The UE of claim 7, wherein the retransmission grant is addressed to a configured scheduling radio network temporary identifier (RNTI).

9. The UE of claim 6, wherein the at least one processor is configured to cause the UE to:
  receive a retransmission grant for the first HARQ process;
  determine that the HARQ buffer is empty; and
  in response to determining that the HARQ buffer is empty, generate a medium access control (MAC) protocol data unit (PDU) based on the retransmission grant.

10. The UE of claim 9, wherein the retransmission grant is addressed to a configured scheduling radio network temporary identifier (RNTI).

11. A processor for wireless communication, comprising:
at least one controller coupled with at least one memory and configured to cause the processor to:
  receive a first uplink grant associated with a first hybrid automatic repeat request (HARQ) process;
  receive a second uplink grant associated with a second HARQ process, wherein the second uplink grant has a higher priority than the first uplink grant;
  determine that a first data transmission corresponding to the first uplink grant is preempted by a second data transmission corresponding to the second uplink grant; and
  in response to the determination that the first data transmission is preempted by the second data transmission:
    not generate a transport block for the first uplink grant; and
    flush a HARQ buffer corresponding to the first HARQ process.

12. The processor of claim 11, wherein the at least one controller is configured to cause the processor to:
  receive a retransmission grant for the first HARQ process;
  determine that the HARQ buffer is empty; and
  in response to determining that the HARQ buffer is empty, generate a new transport block based on the retransmission grant and transmit the new transport block based on the retransmission grant.

13. The processor of claim 12, wherein the retransmission grant is addressed to a configured scheduling radio network temporary identifier (RNTI).

14. The processor of claim 11, wherein the at least one controller is configured to cause the processor to:
  receive a retransmission grant for the first HARQ process;
  determine that the HARQ buffer is empty; and
  in response to determining that the HARQ buffer is empty, generate a medium access control (MAC) protocol data unit (PDU) based on the retransmission grant.

15. The processor of claim 14, wherein the retransmission grant is addressed to a configured scheduling radio network temporary identifier (RNTI).

* * * * *